(12) United States Patent
Reiser et al.

(10) Patent No.: US 7,871,732 B2
(45) Date of Patent: Jan. 18, 2011

(54) SINGLE REACTANT GAS FLOW FIELD PLATE PEM FUEL CELL

(75) Inventors: Carl A. Reiser, Stonington, CT (US); Ryan J. Balliet, West Hartford, CT (US)

(73) Assignee: UTC Power Corporation, South Windsor, CT (US)

( * ) Notice: Subject to any disclaimer, the term of this patent is extended or adjusted under 35 U.S.C. 154(b) by 456 days.

(21) Appl. No.: 11/988,700

(22) PCT Filed: Jul. 15, 2005

(86) PCT No.: PCT/US2005/025325

§ 371 (c)(1),
(2), (4) Date: Jan. 11, 2008

(87) PCT Pub. No.: WO2007/011348

PCT Pub. Date: Jan. 25, 2007

(65) Prior Publication Data

US 2009/0123807 A1    May 14, 2009

(51) Int. Cl.
*H01M 8/24* (2006.01)
*H01M 2/38* (2006.01)

(52) U.S. Cl. .............. 429/452; 429/456; 429/434; 429/439; 429/492; 429/413

(58) Field of Classification Search ............ 429/34, 429/38, 39, 35, 40–42, 20
See application file for complete search history.

(56) References Cited

U.S. PATENT DOCUMENTS 4,157,327 A    6/1979    Martin et al.

(Continued)

FOREIGN PATENT DOCUMENTS

DE    199 21 007 C1    11/2000

OTHER PUBLICATIONS

A.J. Appleby & E.B. Yeager, "4. Solid Polymer Electrolyte Fuel Cells (SPEFCs)", Energy, Jan. 1, 1986, pp. 137-152, vol. 11, No. 1-2, Pergamon Press, Oxford, GB.

*Primary Examiner*—Raymond Alejandro
(74) *Attorney, Agent, or Firm*—M. P. Williams

(57) ABSTRACT

A fuel cell stack (32) includes a plurality of fuel cells in which each fuel cell is formed between a pair of conductive, porous, substantially hydrophilic plates (17) having oxidant reactant gas flow field channels (12-15) on a first surface and fuel reactant gas flow field channels (19, 19a) on a second surface opposite to the first surface, each ~f the plates being separated from a plate adjacent thereto by a unitized electrode assembly (20) including a cathode electrode (22), having a gas diffusion layer (GDL) an anode electrode (23) having a GDL with catalyst between each GDL and a membrane (21) disposed therebetween. Above the stack is a condenser (33} having tubes (34) that receive coolant air (39, 40} to condense water vapor out of oxidant exhaust in a chamber (43). Inter-cell wicking strips (26) receive condensate and conduct it along the length of the stack to all cells. In-cell wicking strips (1G, 1 ~a) on one or both surfaces conduct the water from the inter-cell wicking strips downwardly along the entire planform of each cell. Reactant air is provided to an air inlet manifold (47) through an air inlet conduit (48) from an air pump (49).

4 Claims, 7 Drawing Sheets

U.S. PATENT DOCUMENTS 6,727,014 B1   4/2004 Wilson et al.
2004/0058218 A1 * 3/2004 Atbi et al. .................... 429/34
2004/0170878 A1   9/2004 Goebel

* cited by examiner

SINGLE REACTANT GAS FLOW FIELD PLATE PEM FUEL CELL

TECHNICAL FIELD

This invention relates to a polymer electrolyte, proton exchange membrane PEM fuel cell having a single separator plate including both fuel reactant gas passages and oxidant reactant gas passages, with water wicking material disposed between some of the reactant gas channels on the same edge of the plate therewith.

BACKGROUND ART

In one type of known PEM fuel cell, the reactant gas flow field channels are in "separator" plates (typically called "water transport plates") which also have water channels in the surface of one or both plates opposite to the reactant gas flow channels. The porous and hydrophilic plates allow product water to migrate from the cathode to the water channels, and allow water to migrate from the water channels to the anode, to assure uniform humidification. Cooling of the fuel cell is typically accomplished with the water in the water channels, which is circulated externally of the fuel cell stack to a heat exchanger that is selectively bypassed in order to maintain proper water temperature. Cooler plates may also be used.

When a fuel cell power plant is utilized within an electric vehicle, it is subject to being left inoperative in environments which can reach temperatures below the freezing temperature of water. External water plumbing, pumps, and accumulators are therefore subject to damage from expansion as ice is formed, or otherwise require extensive measures to drain and restore the water, to maintain the temperature above freezing, or to otherwise protect the apparatus from freeze damage.

In vehicles, space and weight are both at a premium. External water management components, such as pumps and accumulators, add to the weight and take up space.

A recent innovation disclosed in copending PCT patent application Ser. No. US 05/13040), filed Apr. 15, 2005, employs evaporative cooling in which water from the cathode is evaporated into the cathode air flow, and condensed at the air exit; the condensate is returned to the cells by means of minute water channels or wicking within or between the water transport plates. However, the need to provide even only a few, minute water channels (or equivalent porous wicking material between the cathode and the anode) between the two electrodes requires the manufacture of two plates, which because of having channels on both sides of at least one of them, requires a certain minimum thickness for physical integrity.

DISCLOSURE OF INVENTION

Objects of the invention include provision of fuel cells: which require a minimal space; which are less expensive than prior art water transport plates; which, although thinner than pairs of prior art water transport plates, are stronger than such pairs; and provision of improved fuel cells and fuel cell power plants. While described in the context of a porous plate technology, this approach may be applied to the use of solid separator plates.

According to the present invention, a fuel cell has a single porous, at least substantially hydrophilic plate containing both fuel reactant gas flow fields and oxidant reactant gas flow fields, which has wicking strips between every N (where N is an integer between one and several) oxidant and/or fuel reactant gas flow field channels to carry product water away from the cathode, and to provide humidification at the fuel and air inlets through the same porous plate, to assure uniform hydration of the entire planform of the cells.

The invention is well suited for use in a fuel cell power plant employing evaporative cooling of the type where product water is evaporated into the oxidant reactant gas flow, condensed at the oxidant exit, with condensate returned to the wicking strips in the porous plates that contain the air flow channels and the fuel flow channels.

The invention is also effective in any embodiment which requires the use of cooler plates disposed between, typically, every two-four fuel cells, such as when long life coolant (e.g., glycol) is used. Where coolant plates are used, the fuel cell stack can become extremely long; use of the present invention allows significant reduction in the size of the fuel cells, thereby reducing the overall stack length.

The invention may employ wicks which are formed of a material which is hydrophilic, and having a relatively high in-plane permeability to water. Such material may be carbon fiber paper, or it may be other material conventionally used as fuel cell diffusion media, treated conventionally for such hydrophilicity as is needed.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
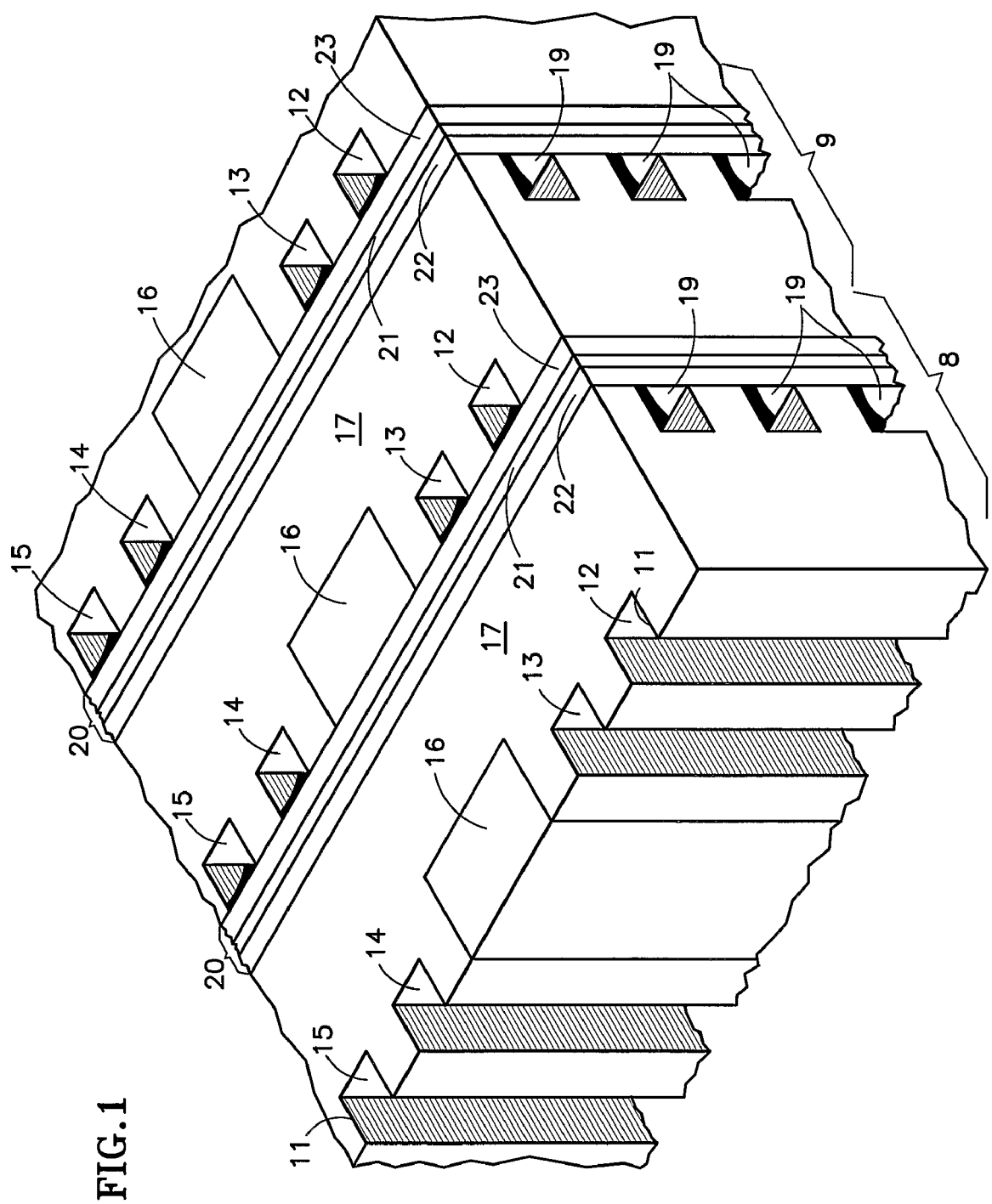
FIG. 1 is a partial perspective view of a pair of fuel cells having in-cell wicking strips of the present invention.

Referring to FIG. 1, a pair of fuel cells 8, 9 each include a plurality of vertical grooves 11 forming oxidant reactant gas flow field channels 12-15, with an in-cell wicking strip 16 disposed in a slot between the channels 13 and 14, in a conductive, porous, separator plate 17, which is preferably substantially hydrophilic. Each plate 17 has, in this embodiment, horizontal fuel reactant gas flow field channels 19.

Each fuel cell 8, 9 also includes, in this embodiment, a unitized electrode assembly 20 which comprises a polymer electrolyte, proton exchange membrane (PEM) 21 with a cathode electrode 22 having a gas diffusion layer (GDL) and an anode electrode 23 having a GDL, with catalyst between the PEM and each GDL. As shown by arrows in FIG. 2, air will flow, in this embodiment, upwardly through the channels 12-15; typically, the fuel will flow from right to left (or vice versa) in half the channels 19 and then flow from left to right (or vice versa) in another half of the channels (not shown).

The plates 17 typically will have pores of about 2 microns in diameter. To avoid flooding of the gas diffusion layer, which has pores of around 25 microns in diameter, the wicking strips should also have pores of between about 2 microns and 25 microns in diameter.

Figure 2:
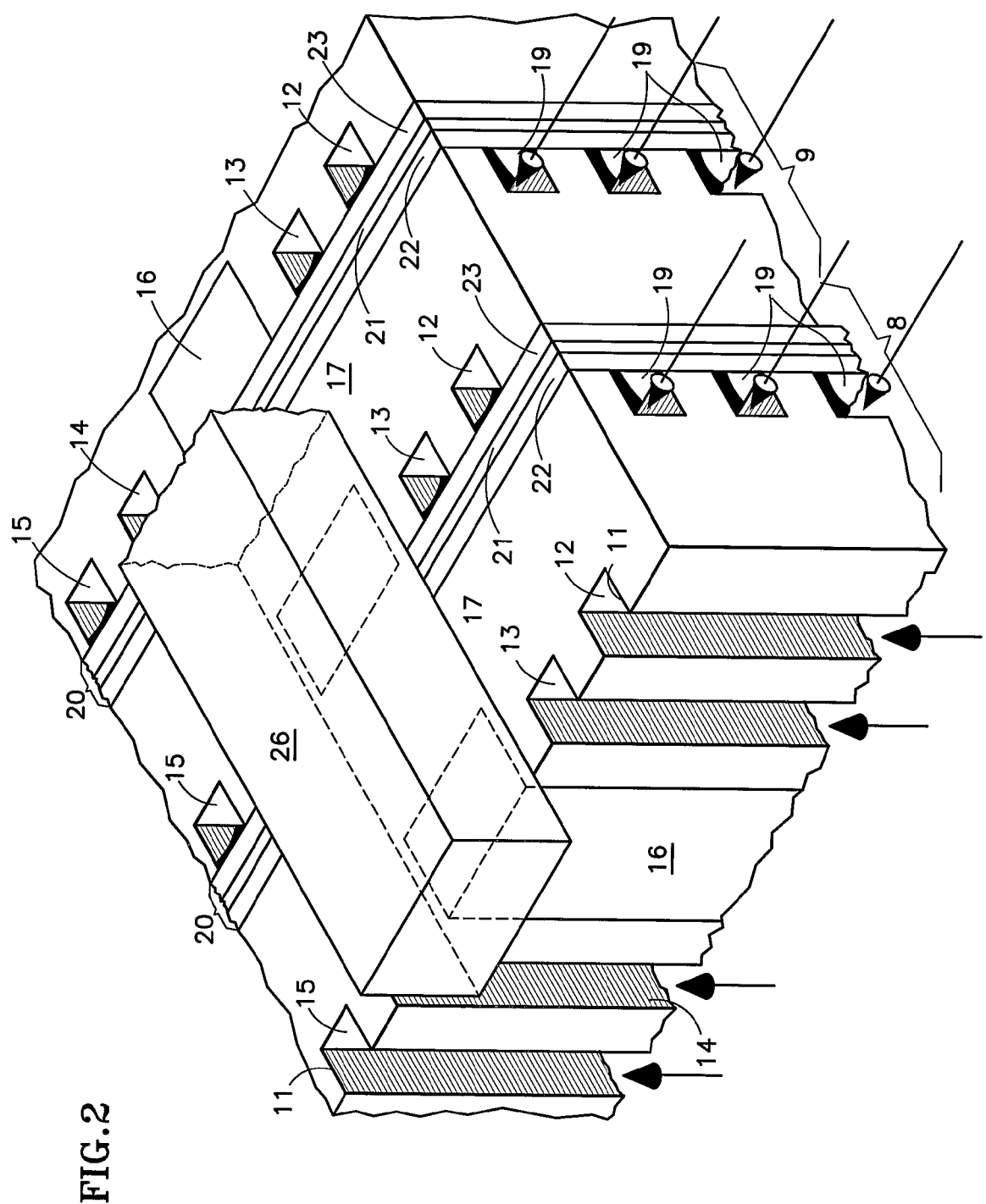
FIG. 2 is a perspective view of the fuel cells of FIG. 1 having an inter-cell wicking strip applied thereto.

In FIG. 2, inter-cell wicking strips 26, in the first instance, carry water to the in-cell wicking strips 16 from a condenser 33, in this embodiment referred to hereinafter with respect to FIG. 3. The inter-cell wicking strips 26 also act as a moisture equalization device which tends to assure that all of the cells are equally humidified, and farther acts as a water storage device, taking up product water from the reactant air channels 12-15 and spreading it among the plates 17 to assure hydration of the entire planform of the porous plates. The inter-cell wicking strips must be poor electrical conductors, and may, for instance, be fashioned from paper, wettable polyester fibers, or polypropylene. The fibers in the wicking strips should be oriented in the direction of intended water flow.

Figure 3:
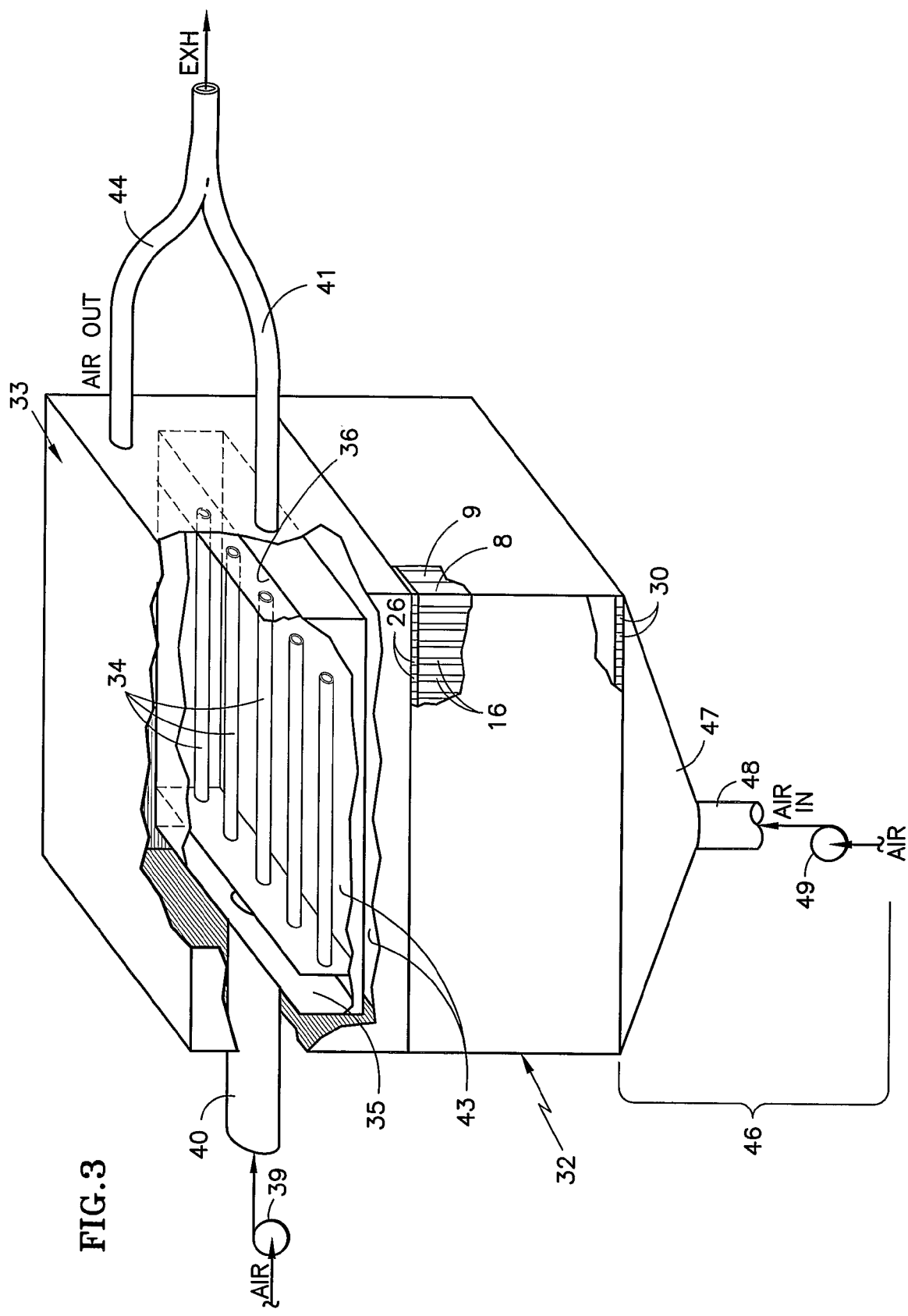
FIG. 3 is a simplified, stylized, partially broken away schematic perspective view of a portion of a fuel cell power plant employing the fuel cells and wicking of FIG. 2.

As briefly illustrated in FIG. 3, at the bottom of the fuel cells 8, 9 there is preferably additional inter-cell wicking strips 30, similar to the wicking strips 26. While the bottom, inter-cell wicking strips 30 will not serve to conduct condensate to the cells, the wicking strips 30 will serve to assure uniform humidification of all the cells, and to provide storage for product water.

In FIGS. 1 and 2, in-cell wicking strips 16 are formed in the plate 17 between pairs of oxidant channels 12, 13; 14, 15. However, the in-cell wicking strips 16 and inter-cell wicking strips 26, 30 may be between N reactant gas channels, where N is an integer between one and "several", where "several" may be 4, 5 or even 10 or more, depending upon pore size, porosity, hydrophilicity, thickness, and other properties of the plate 17.

In FIG. 3, the fuel cells 8, 9 are in a fuel cell stack 32 above which there is disposed a condenser 33 having coolant air flow tubes 34 with a coolant air inlet manifold 35 and a coolant air outlet manifold 36. Coolant air from a pump 39 flows through an inlet pipe 40, and the outflow from the manifold 36 flows through a conduit 41 to exhaust. The cathode exhaust flows upwardly from the fuel cells 8, 9 into an oxidant exhaust outlet manifold chamber 43 where the exhausted air passes between the grid of coolant air tubes 34 and thence through an air out conduit 44 to exhaust. The water vapor in the cathode exhaust air is condensed on the surfaces of the tubes 34 and collects at the bottom of the chamber 43, where it is taken up by the inter-cell wicking strips 26. Reactant air is provided through a fluid handler 46 which comprises, among other components, an inlet manifold 47 coupled to an air inlet conduit 48 and an air pump 49.

Not shown herein for clarity, the top of the stack 32 may preferably be provided with a sealing cover which has holes therein contiguous with the inter-cell wicking strips 26 and with the tops of the reactant air flow channels 12-15, so as to allow air to pass upwardly and moisture to enter the wicking, without submersing the tops of the fuel cells 8, 9 in water. Instead, the unitized electrode assemblies 20, 21 may be sealed with silicon rubber, or with strips of other materials suitably adhered thereto. Any other suitable arrangements may be used.

Since the wicking strips 16, 26 are vented through the chamber 43, no other vent need be provided. If the air exhaust out conduit 44 is too high to serve as a water overflow relief port, a small outlet (not conducive to carrying significant cathode exhaust air) may be provided at a suitable height in the wall of the condenser 33. Since, in the normal course, the cathodes continuously produce water, excess water will generally be provided once the fuel cell is fully operational, in each usage thereof.

The invention may as well be implemented with a downward flow of air, the condenser being at the bottom of the stack, in a manner that is obvious in view of FIGS. 1-3 herein.

Figure 4:
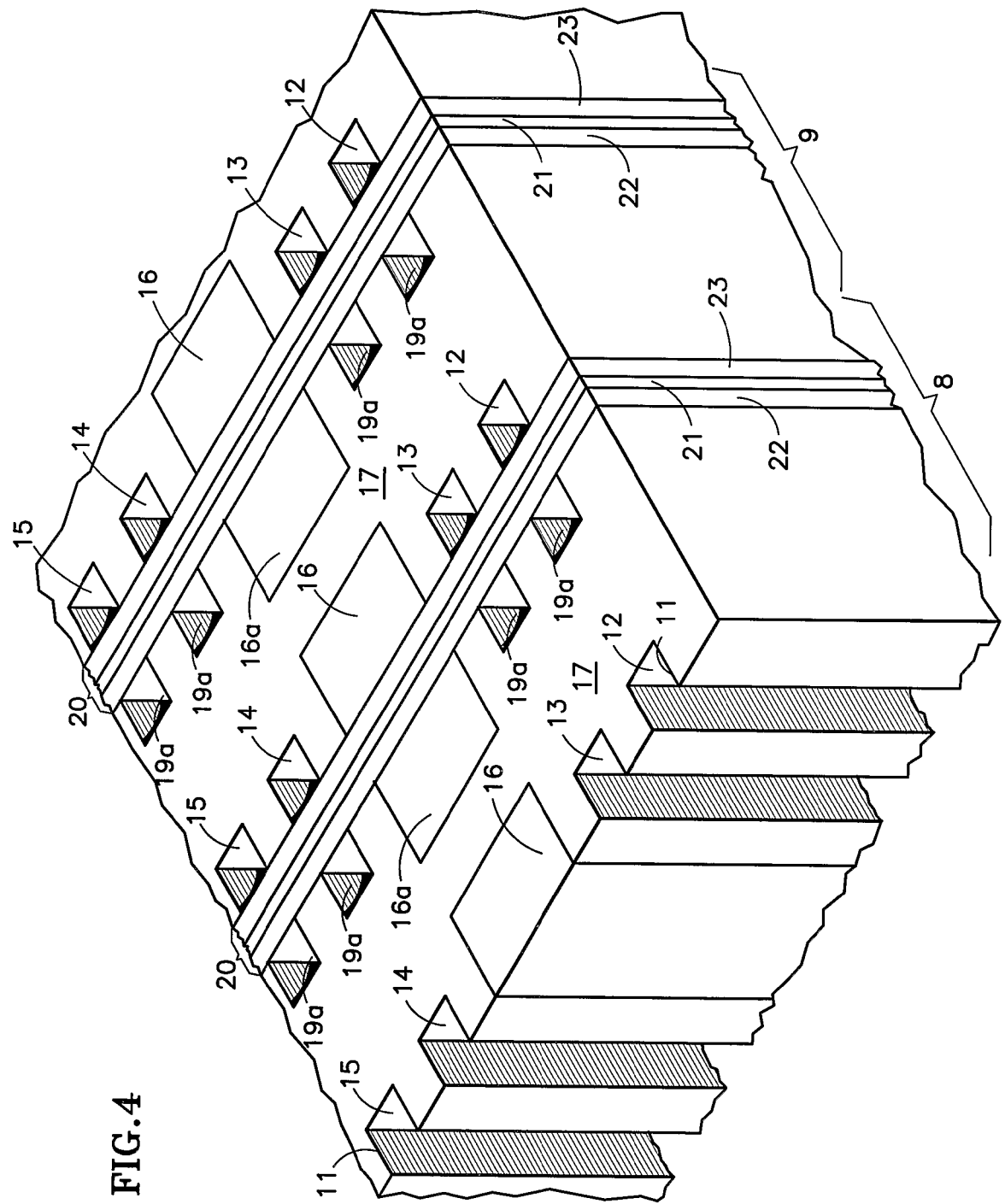
FIG. 4 is a partial perspective view of a pair of fuel cells having in-cell wicking strips adjacent both oxidant and fuel channels.

FIG. 4 illustrates that wicking strips 16a may be placed in grooves between vertical fuel reactant gas flow field channels 19a. If desired, wicking strips (not shown) may be placed in horizontal grooves (not shown) between some horizontal fuel reactant gas flow field channels 19, but the between-cell wicking strips would be horizontal (fore and aft in FIG. 1) to avoid blocking the flow of fuel; that would require additional means to communicate such wicking strips with a condenser.

Figure 5:
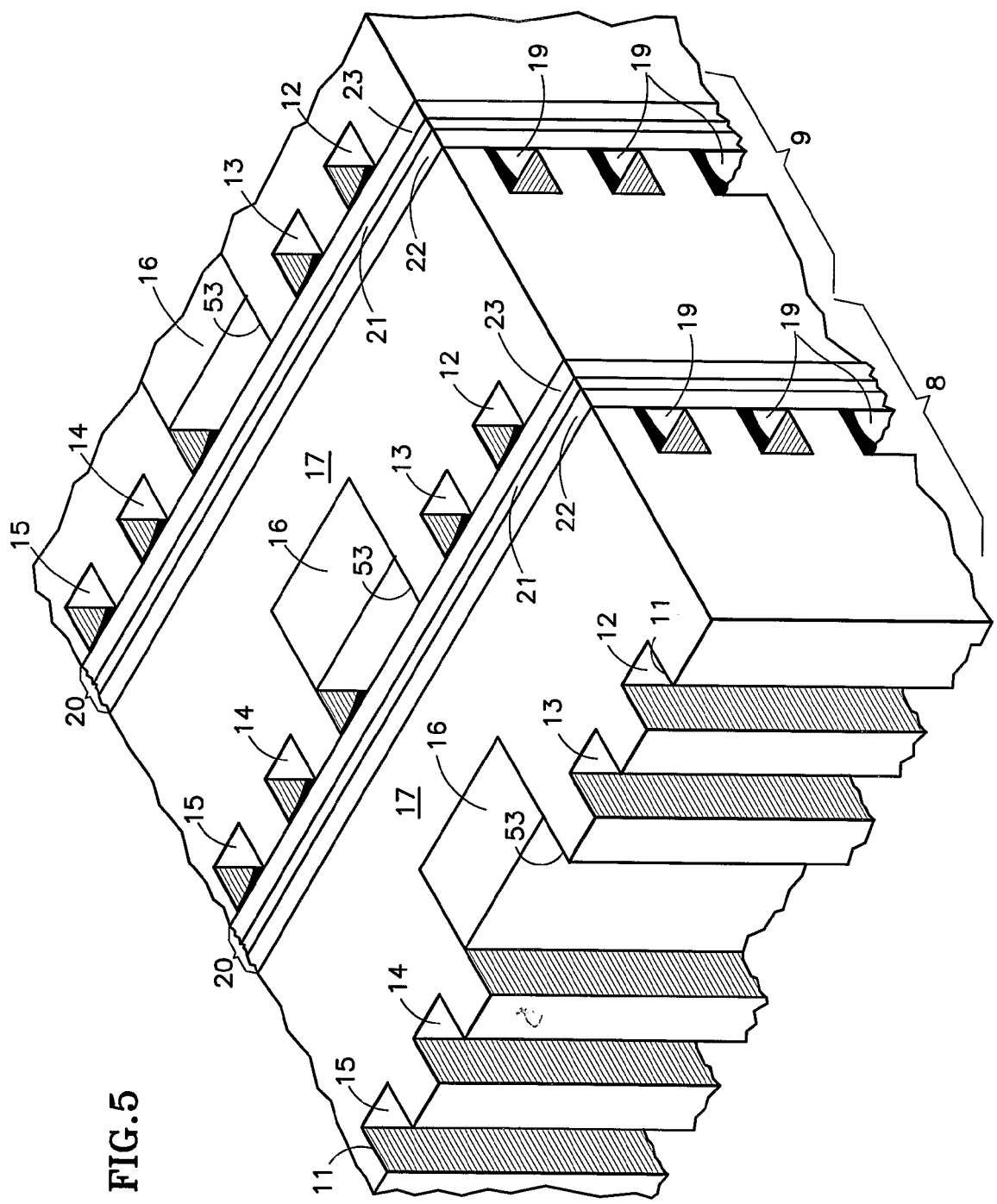
FIGS. 5 and 6 are partial perspective views of a pair of fuel cells having in-cell wicking strips in oxidant flow channels.

FIG. 5 illustrates wicking strips 16 within slots 53 that are deep enough to provide additional oxidant reactant flow channels. If desired, all the channels 12-15 may be wide and deep, like slots 53, to both contain wicking strips and provide for oxidant flow in the same slots.

Figure 6:
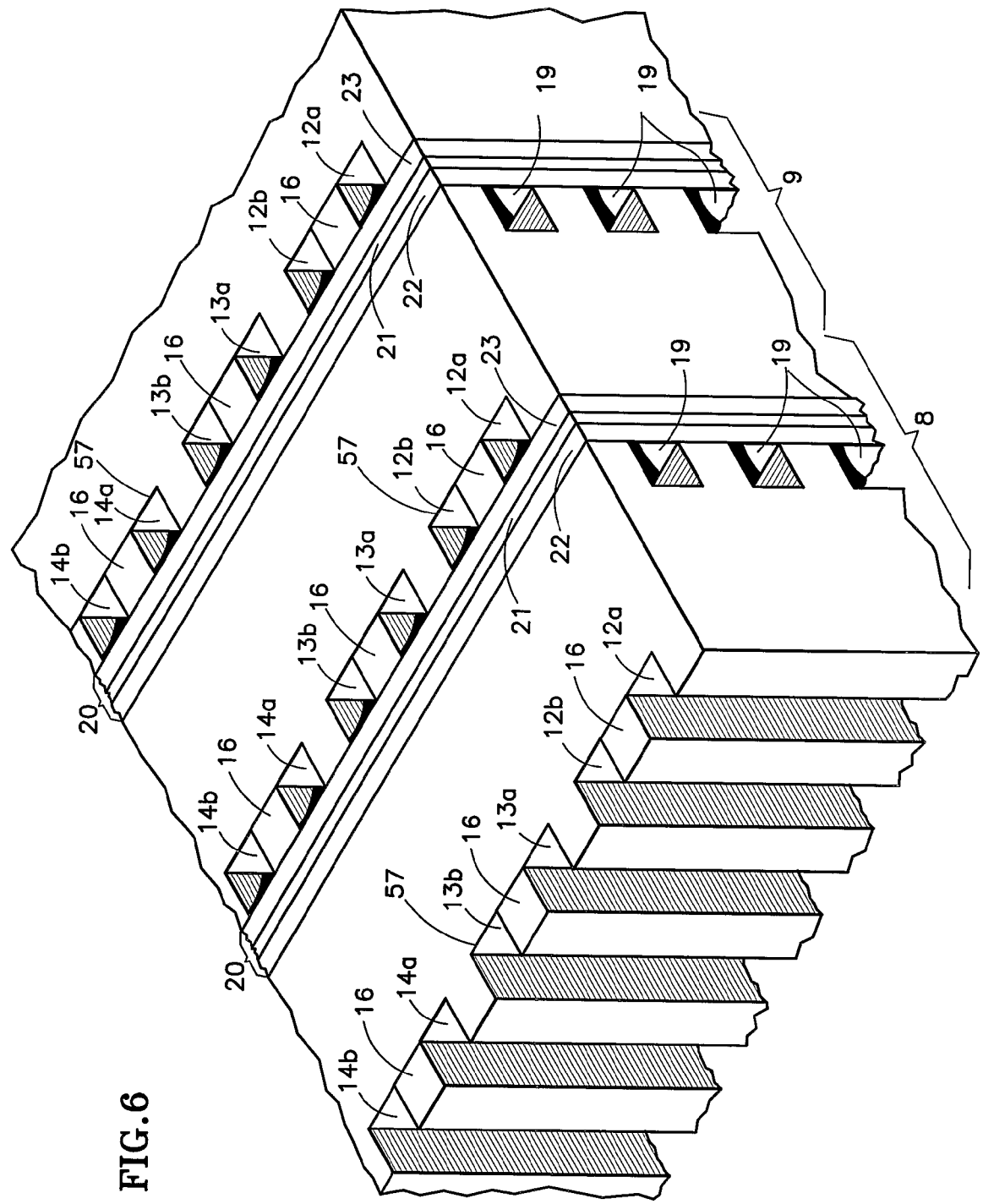

FIG. 6 illustrates another embodiment in which the slots 57 are wide enough to accommodate wicking strips 16 in the center of the slots while providing reactant gas flow channels 12a, 12b, 13a, 13b, 14a, 14b, on either side of each wicking strip.

Figure 7:
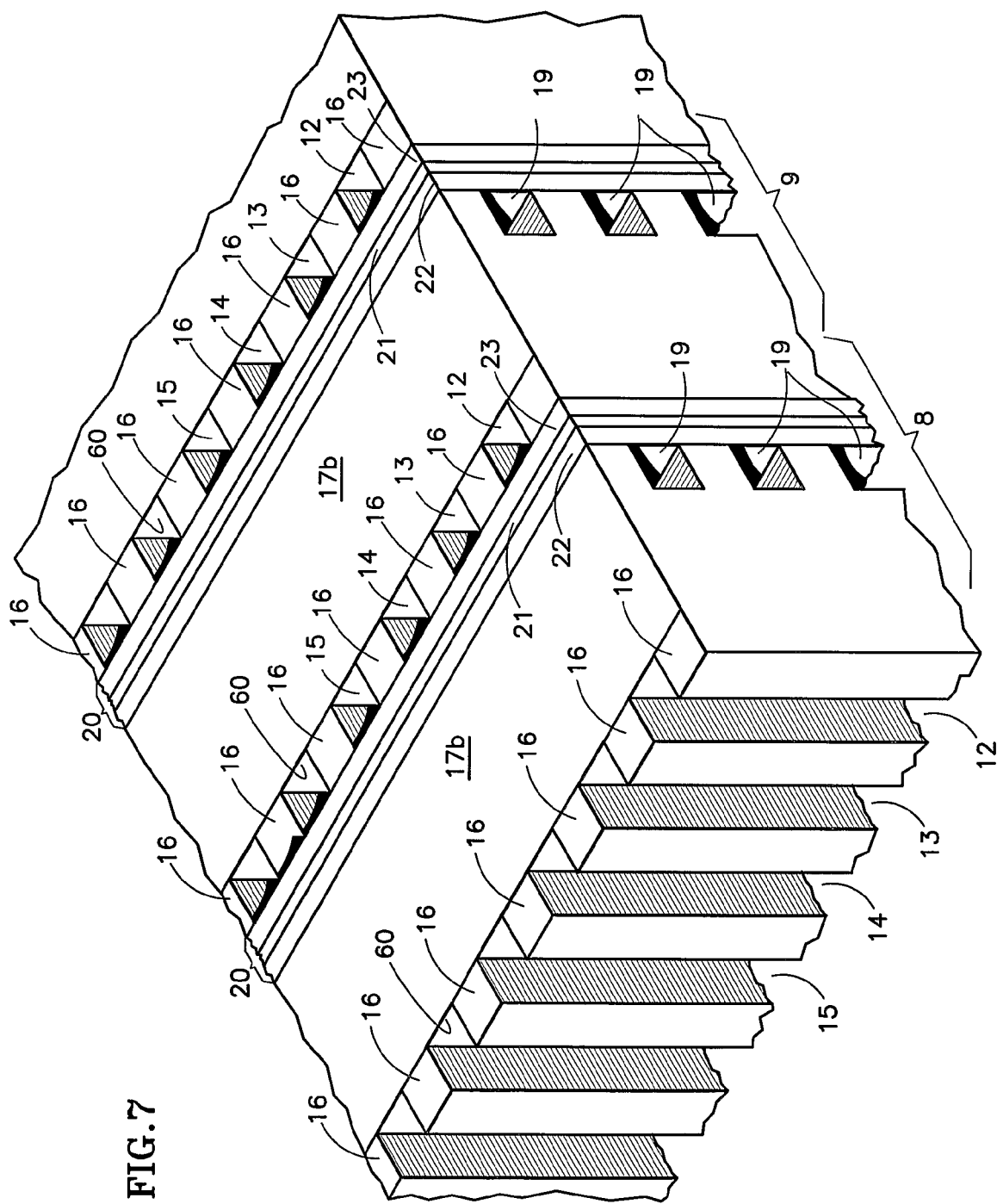
FIG. 7 is a partial perspective view of a pair of fuel cells having oxidant flow channels formed by spaced-apart wicking strips.

FIG. 7 illustrates plates 17b which have flat surfaces 60, with no slots or oxidant reactant gas flow field channels formed therein. Instead, the oxidant reactant gas flow field channels 12-15, etc. are formed by adjacent wicking strips 16. In this configuration at least some, and preferably all, the wicking strips 16 comprise a conductive material.

The invention claimed is:

1. A fuel cell power plant characterized by:
   a fuel cell stack (32) characterized by:
   a plurality of fuel cells (8, 9), said plurality of fuel cells comprising a plurality of conductive separator plates (17), each separator plate is substantially hydrophilic and porous, each separator plate having a plurality of substantially vertical oxidant reactant gas flow field channels (12-15) adjacent to a first surface thereof formed by grooves extending into said plate from said first surface, and a plurality of fuel reactant gas flow field channels (19, 19a) adjacent to a second surface thereof opposite to said first surface, each of said plates being separated from one or more of said plates adjacent thereto by one or more unitized electrode assemblies (20) including a cathode (22) having a gas diffusion layer and an anode (23) having a gas diffusion layer, each gas diffusion layer separated from a proton exchange membrane (21) by catalyst, and
   a plurality of in-cell wicking strips (16);
   said reactant gas flow field channels formed adjacent to at least one of said surfaces (60) of said plates, said reactant gas flow field channels either formed by (a) grooves (11) extending into said plates from a corresponding one of said surfaces (i) with said in-cell wicking strips being within said grooves or (ii) with said in-cell wicking strips being in slots between some of said grooves, or (b) by said wicking strips being disposed in mutually spaced apart, evenly spaced relationship across said corresponding surface, the spaces between adjacent ones of said wicking strips forming said reactant gas flow field channels;
   a plurality of inter-cell wicking strips (26, 30) in fluid communication with at least one of corresponding in-cell wicking strips (16, 16a) in each of said plates, said in-cell wicking strips in said cells being in fluid communication with a corresponding one of said inter-cell wicking strips;

an oxidant exhaust outlet manifold chamber (43) disposed adjacent said fuel cell stack (32) in fluid communication with said oxidant reactant gas flow field channels (12-15);

a condenser (33) having coolant air tubes (34), through which coolant air can flow, disposed within said oxidant exhaust outlet manifold chamber, exhaust from said oxidant gas flow field channels passing through said manifold so that water vapor in said exhaust is condensed by said tubes in said chamber;

said plurality of inter-cell wicking strips disposed on the top (26) and/or bottom (30) of said stack in fluid communication with condensate from said condenser, oriented in a direction substantially transverse to the plane of said plates (17), each in fluid communication with the top or bottom of corresponding ones of said in-cell wicking strips; and a fluid handler (46) for flowing oxidant reactant gas through said oxidant reactant gas flow field channels.

2. A fuel cell power plant according to claim 1 wherein:
said inter-cell wicking strips are disposed both on the top (26) and on the bottom (30) of said stack.

3. A fuel cell power plant according to claim 1 wherein:
said oxidant exhaust outlet manifold chamber (43) is disposed above said fuel cell stack (32).

4. A fuel cell power plant characterized by:
a fuel cell stack (32) further characterized by:
a plurality of fuel cells (8, 9), said plurality of fuel cells comprising a plurality of conductive separator plates (17), each separator plate is substantially hydrophilic and porous, each separator plate having a plurality of substantially vertical oxidant reactant gas flow field channels (12-15) adjacent to a first surface thereof formed by grooves extending into said plate from said first surface, and a plurality of fuel reactant gas flow field channels (19, 19*a*) adjacent to a second surface thereof opposite to said first surface, each of said plates being separated from one or more of said plates adjacent thereto by one or more unitized electrode assemblies (20) including a cathode (22) having a gas diffusion layer and an anode 23 having a gas diffusion layer, each gas diffusion layer separated from a proton exchange membrane (21) by catalyst, and a plurality of in-cell wicking strips (16);

said reactant gas flow field channels formed adjacent to at least one of said surfaces (60) of said plates, said reactant gas flow field channels either formed by (a) grooves (11) extending into said plates from a corresponding one of said surfaces (i) with said in-cell wicking strips being within said grooves or (ii) with said in-cell wicking strips being in slots between some of said grooves, or (b) by said wicking strips being disposed in mutually spaced apart, evenly spaced relationship across said corresponding surface, the spaces between adjacent ones of said wicking strips forming said reactant gas flow field channels;

a plurality of inter-cell wicking strips (26, 30), each in fluid communication with a corresponding one of the in-cell wicking strips (16, 16*a*) in each of said plates, all of the in-cell wicking strips in all of said cells being in fluid communication with a corresponding one of said inter-cell wicking strips;

an oxidant exhaust outlet manifold chamber (43) disposed adjacent said fuel cell stack (32) in fluid communication with said oxidant reactant gas flow field channels (12-15);

a condenser (33) having coolant air tubes (34), through which coolant air can flow, disposed within said oxidant exhaust outlet manifold chamber, exhaust from said oxidant gas flow field channels passing through said manifold so that water vapor in said exhaust is condensed by said tubes in said chamber;

said plurality of inter-cell wicking strips disposed on the top (26) and/or bottom (30) of said stack in fluid communication with condensate from said condenser, oriented in a direction substantially transverse to the plane of said plates (17), each in fluid communication with the top or bottom of corresponding ones of said in-cell wicking strips; and a fluid handler (46) for flowing oxidant reactant gas vertically through said oxidant reactant gas flow field channels.

\* \* \* \* \*